(12) United States Patent
Hatam-Tabrizi (10) Patent No.: US 6,172,944 B1
(45) Date of Patent: Jan. 9, 2001

(54) MAGNETO-OPTICAL RECORDING APPARATUS WITH MAGNETIC HEAD DECOUPLED FROM OBJECTIVE LENS FOCUS ACTUATOR

(75) Inventor: Shahab Hatam-Tabrizi, San Jose, CA (US)

(73) Assignee: Maxoptix Corporation, Fremont, CA (US)

(*) Notice: Under 35 U.S.C. 154(b), the term of this patent shall be extended for 0 days.

(21) Appl. No.: 09/027,420

(22) Filed: Feb. 20, 1998

(51) Int. Cl.[7] ................................... G11B 11/00
(52) U.S. Cl. ................. 369/13; 369/284; 369/44.22
(58) Field of Search ............... 369/13, 292, 283, 369/284, 286, 275.1, 275.2, 288, 14, 111, 44.22, 44.38, 44.39; 360/59, 114

(56) References Cited

U.S. PATENT DOCUMENTS

| | | |
|---|---|---|
| 4,449,138 | 5/1984 | Ando . |
| 4,788,671 * | 11/1988 | Kanda ................................. 369/13 |
| 4,807,204 | 2/1989 | Mizutani et al. ..................... 369/13 |
| 4,965,780 | 10/1990 | Lee et al. ............................. 369/13 |
| 5,004,307 | 4/1991 | Kino et al. .......................... 350/1.2 |
| 5,105,408 | 4/1992 | Lee et al. ......................... 369/44.15 |
| 5,121,256 | 6/1992 | Corle et al. ......................... 359/664 |
| 5,125,750 | 6/1992 | Corle et al. ......................... 359/819 |
| 5,150,338 | 9/1992 | Birecki et al. ........................ 369/13 |
| 5,161,134 | 11/1992 | Lee ....................................... 369/13 |
| 5,191,563 | 3/1993 | Lee et al. .............................. 369/13 |
| 5,197,049 * | 3/1993 | Wehrenberg ......................... 369/13 |
| 5,197,050 | 3/1993 | Murakami et al. ................... 369/13 |
| 5,202,880 | 4/1993 | Lee et al. ............................ 369/275 |
| 5,247,510 | 9/1993 | Lee et al. ............................ 369/118 |
| 5,255,260 | 10/1993 | Yamada et al. . |
| 5,276,674 | 1/1994 | Tanaka . |
| 5,287,334 * | 2/1994 | Iwabuchi et al. ..................... 369/13 |
| 5,307,336 | 4/1994 | Lee et al. ............................ 369/112 |
| 5,497,359 | 3/1996 | Mamin et al. .................... 369/44.15 |
| 5,533,001 | 7/1996 | Watanabe et al. . |
| 5,712,842 | 1/1998 | Yamamoto et al. ................. 369/112 |
| 5,745,443 | 4/1998 | Yoshida et al. ....................... 369/13 |
| 5,745,464 | 4/1998 | Taguchi et al. ....................... 369/59 |
| 5,786,078 | 7/1998 | Sekiya et al. ........................ 428/332 |
| 5,790,483 | 8/1998 | Kawai ................................... 369/13 |
| 5,828,644 | 10/1998 | Gage et al. ......................... 369/112 |
| 5,838,646 | 11/1998 | Watanabe et al. . |
| 5,859,814 | 1/1999 | Kino et al. ............................ 369/13 |
| 5,910,932 | 6/1999 | Watanabe et al. . |
| 5,914,915 | 6/1999 | Watanabe et al. . |

FOREIGN PATENT DOCUMENTS 8-212579    8/1996    (JP) .

* cited by examiner

*Primary Examiner*—Ali Neyzari
(74) *Attorney, Agent, or Firm*—Blakely, Sokoloff, Taylor & Zafman, LLP (57) ABSTRACT

A method and apparatus for reading from and writing to a magneto-optical disc. The apparatus comprises a first objective lens situated between a first side of the magneto-optical disc and a first source of a laser light. The apparatus further comprises a first flying magnetic head situated between the first objective lens and the first side of the magneto-optical disc, including a first coil for supplying a first magnetic field, the first coil defining a light channel through the first flying magnetic head for allowing the laser light to reach the magneto-optical disc.

4 Claims, 8 Drawing Sheets

FIG_1 (PRIOR ART)

FIG_2 (PRIOR ART)

FIG_3 (PRIOR ART)

FIG_4

FIG_5

FIG_6

FIG. 7

MAGNETO-OPTICAL RECORDING APPARATUS WITH MAGNETIC HEAD DECOUPLED FROM OBJECTIVE LENS FOCUS ACTUATOR

The present application is related to application Ser. Nos. 09/148,765 filed Sep. 4, 1998, and 09/026,798 filed Feb. 20, 1998, both of which are assigned to the assignee of the present application.

FIELD OF THE INVENTION

The present invention generally relates to the field of disc drive mechanisms for reading data from and writing data to data storage discs. More particularly, the present invention relates to the field of magneto-optical (MO) disc drives.

BACKGROUND OF THE INVENTION

Typical magneto-optical (MO) disc drives record data by locally heating a portion of the disc. MO discs, or media, include a recording layer of a magnetic material. The coercivity of the heated portion of the media is lowered when it is heated by the laser beam. This allows the magnetic polarity in that area to be reversed by an applied magnetic field. In such disc drives, data is read from media by illuminating areas of the storage media with a linearly polarized laser beam. The Kerr rotation effect causes the plane of polarization of the illuminating beam to be rotated. The direction of rotation depends on the magnetic polarity in the illuminated area of the storage media. When the disc is read, the polarization rotation is determined with a pair of optical detectors and a polarization beam splitter to produce an output data signal. Limitations of MO disc drives include data access time and density with which data can be stored.

Figure 1:
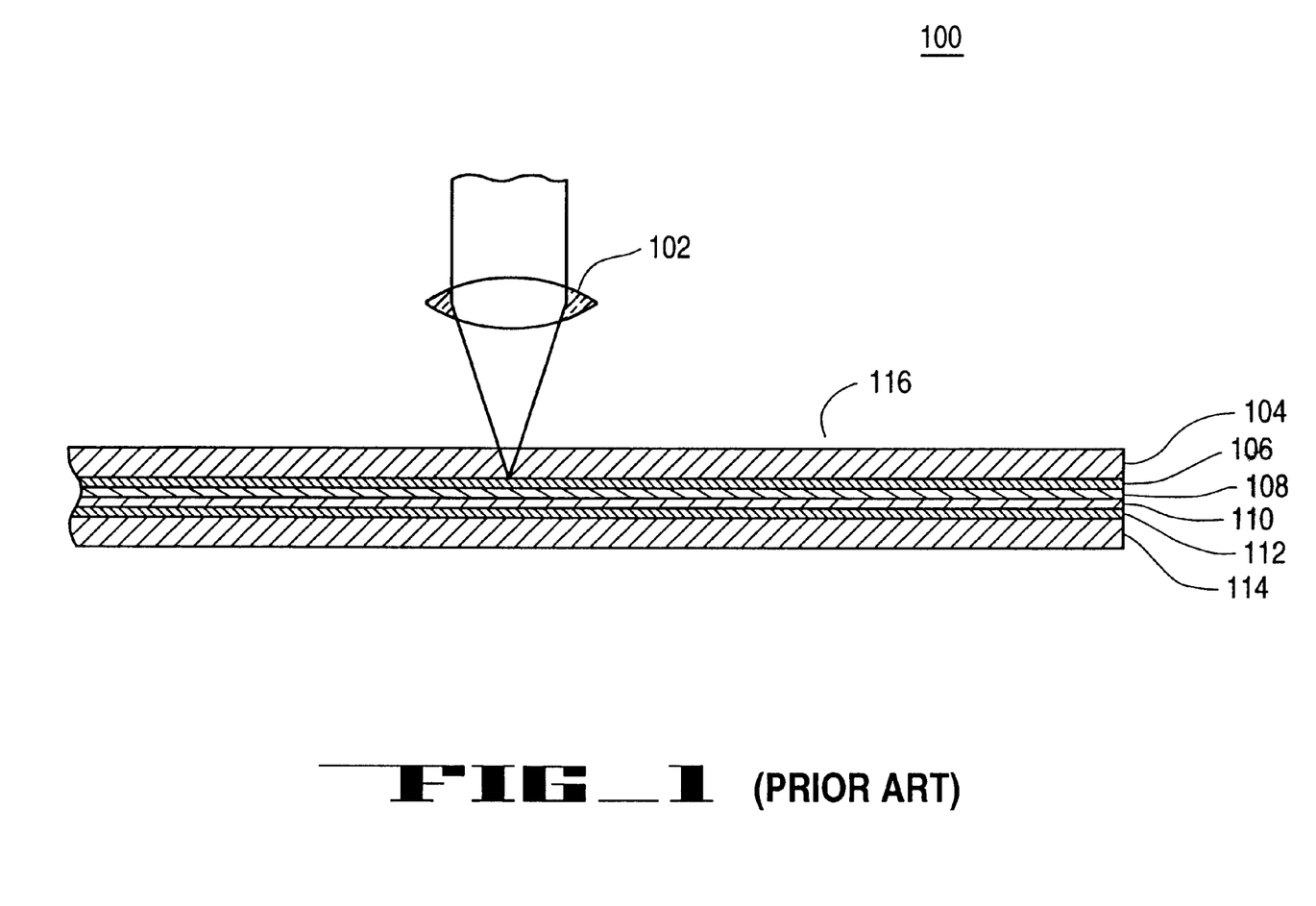
FIG. 1 is a diagram of a prior art magneto-optical (MO) data storage and retrieval system.

FIG. 1 is a diagram of prior MO recording system 100 typically used with 130 millimeter (mm) diameter MO media. System 100 is an example of a "substrate incident" recording system. In substrate incident systems, laser light is incident on a thick substrate layer, travels through the substrate layer and is focused on a recording layer below the substrate layer. System 100 includes objective lens 102 for focusing a collimated beam of light on disc 116. Disc 116 is an example of a typical two-sided MO disc. MO disc 116 includes substrate layers 104 and 114 forming outside layers on opposing sides of disc 116. Substrate layers of 104 and 114 are made of materials such as plastic polycarbonate and are approximately 1.2 mm thick. Recording layer 106 is below substrate layer 104, and recording layer 112 is below substrate layer 114. Recording layers 106 and 112 can be made out of any one of a number of well-known materials, such as Th—Fe—Co, a rare-earth transition-metal alloy. The laser light beam passing through objective lens 102 penetrates substrate layer 104 as shown and is incident on a focal point on the surface of recording layer 106.

System 100 has several disadvantages. One of the disadvantages of system 100 is that it is necessary to apply energy to the recording layer to erase data prior to writing new data. This is because a large, stationary magnetic coil (not shown) having a large inductance is situated on the opposite side of disc 116 from objective lens 102 to assist in the writing process. Because the coil is held at a relatively great distance form the media surface and has a relatively large inductance, the magnetic field cannot be reversed at high frequencies. Therefore, it is necessary to erase data before writing new data. The necessity of erasing before rewriting slows the process of writing data to disc 116.

Another disadvantage of system 100 is that the density of data stored on disc 116 is relatively low. A further disadvantage of system 100 is that only one side of disc 116 can be accessed at one time. This is because the relatively large coil occupies the space on the side of the disc opposite the objective lens. This space cannot therefore be used for another lens and actuator. In order to access a different side of disc 116, disc 116 must be removed, turned over, and reinserted into system 100. Disc 116, however, provides good data security because relatively thick substrate layers 104 and 114 allow disc 116 to be handled without danger of data loss or difficulty in reading data because of contamination.

Figure 2:
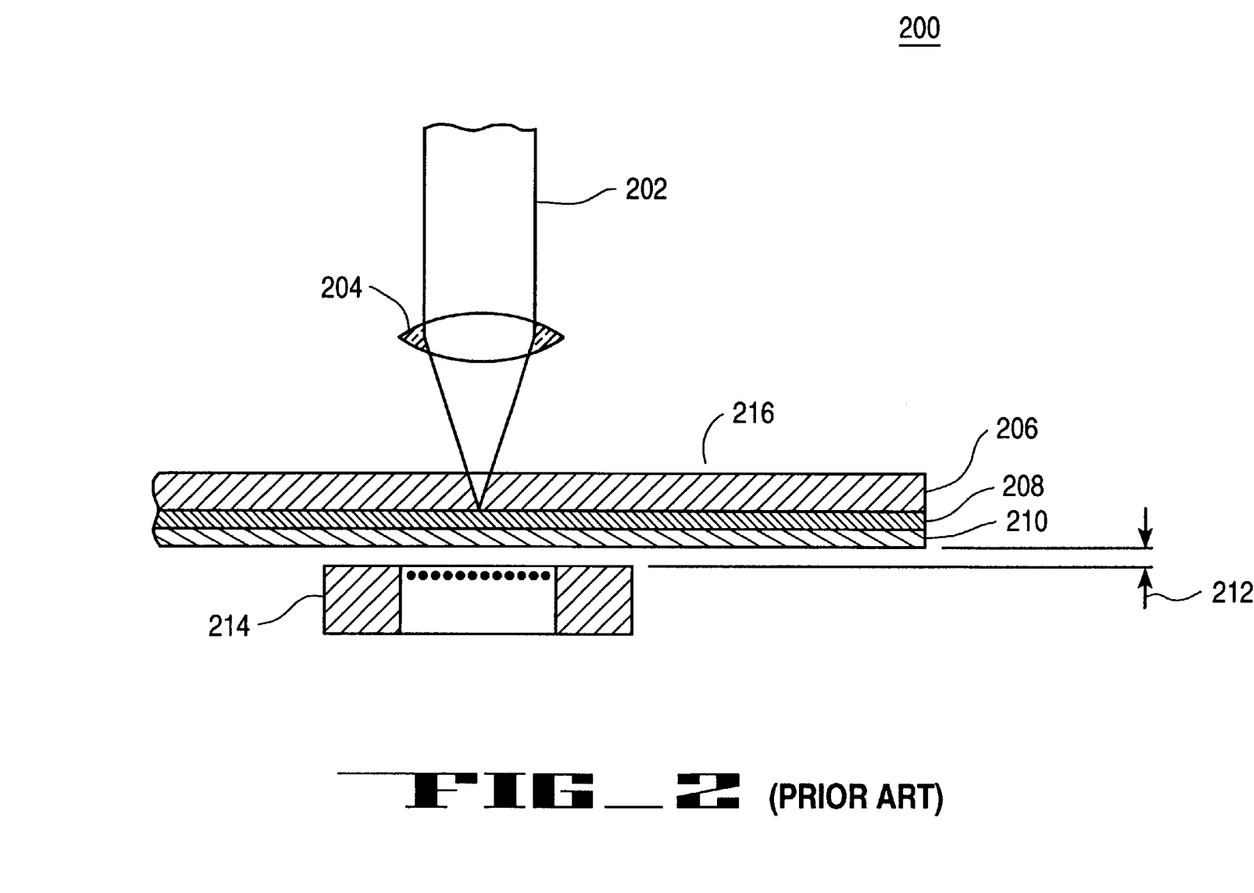
FIG. 2 is a diagram of a prior art MO data storage and retrieval system.

FIG. 2 is a diagram of another prior MO recording system 200.

Collimated light beam 202 passes through objective lens 204 to disc 216. Disc 216 includes substrate layer 206 that is typically 0.6–1.2 mm thick. Disc 216 further includes recording layer 208 between substrate layer 206 and protective layer 210. In system 200, the large, stationary coil of system 100 is replaced by a relatively small coil in flying magnetic recording head 214. Flying height 212 is maintained by an air bearing created when disc 216 passes under flying magnetic recording head 214. For writing to disc 216, a magnetic field created by magnetic recording head 214 is used in conjunction with collimated light 202 which passes through objective lens 204. The smaller coil of magnetic recording head 214 has less inductance than the large, stationary coil of system 100. The reduced inductance allows direct overwrite of data on disc 216 by switching the magnetic field.

System 200 still possesses the disadvantage of relatively low storage densities, however. In addition, disc 216 is a one-sided, rather than a two-sided disc, reducing overall storage capacity.

System 200 also has the disadvantage of requiring mechanical coupling of light on one side of disc 216 and magnetic recording head 214 on the other side of disc 216. Typically, this coupling is accomplished by mechanical linkages that pass from objective lens 202 to magnetic recording head 214 around the edge of disc 216. The mechanical linkages cannot be allowed to interfere with the movement of objective lens 202 (during focussing) or with disc 216.

Figure 3:
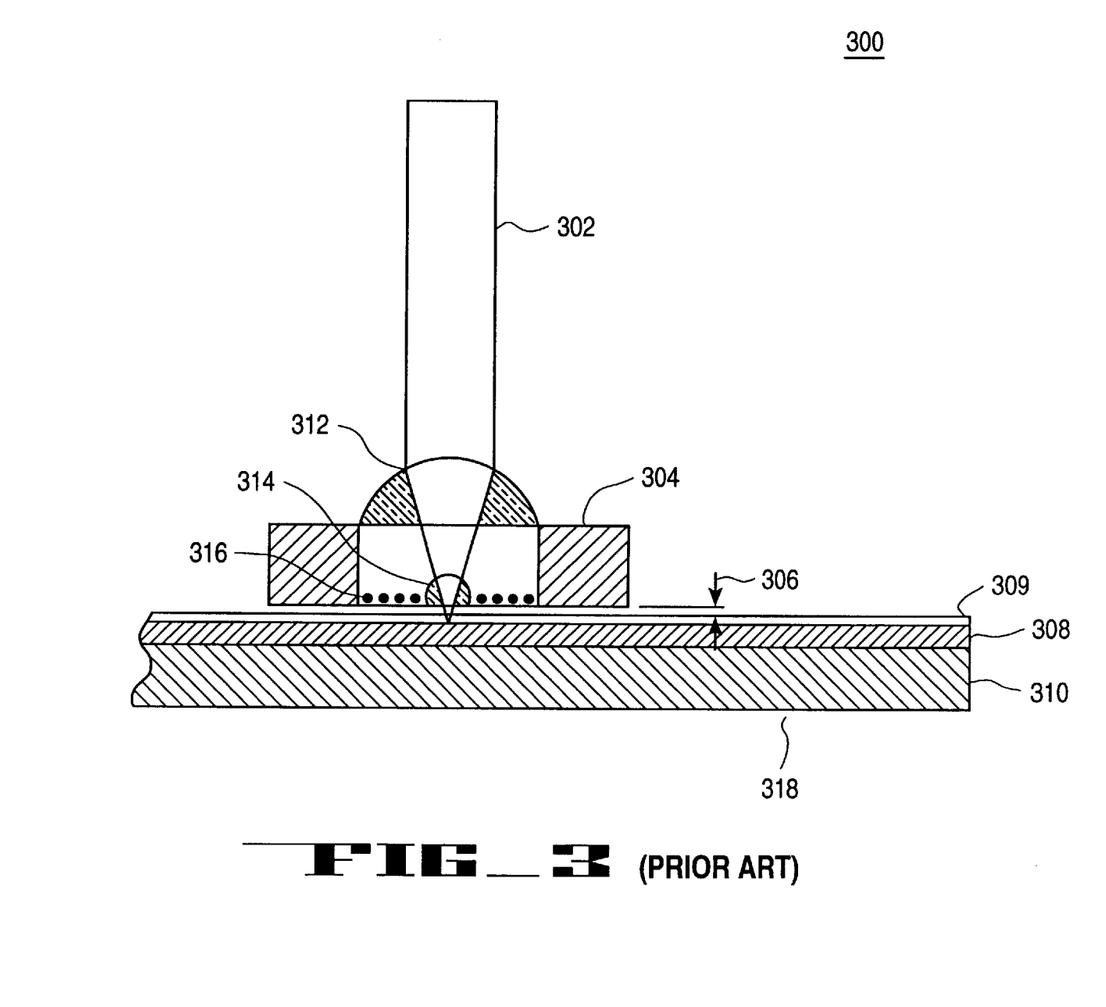
FIG. 3 is a diagram of a prior art MO data storage and retrieval system.

FIG. 3 is a diagram of prior MO recording system 300. System 300 is an example of an "air incident" design in which a lens is held very close to the media and laser light is incident on very thin protective layer 309 that is over recording layer 308 of disc 318. System 300 employs flying magnetic recording head 316, and a two-piece objective lens comprised of lens 314 and lens 312. Prior art systems similar to system 300 use other lens designs, for example, three-piece objective lens designs. Lens 314 is held extremely close to disc 318. Collimated light beam 302 passes through lens 312 and lens 314. Lens 312 and lens 314 are integrated with slider 304 and magnetic recording head 316. Flying height 306 for system 300 is typically less than the wavelength of the laser light used in reading from and writing to MO disc 318.

Disc 318 has an MO recording layer 308 over substrate layer 310. Because in system 300, flying objective lens 314 is in close proximity to disc 318, the need for a focus actuator is eliminated. As is known, focus actuators are mechanisms that adjust the height of an objective lens over a disc during read and write operations. In the case of system 300, the height of flying objective lens, and thus the focus of flying objective lens 314, is determined by the air bearing created between slider 304 and recording layer 308 during flight.

By maintaining the spacing between flying objective lens 314 and recording layer 308 at less than the wavelength of the laser light used, laser light can be focused in the near field mode of operation. As is known, the near field mode of operation uses the phenomenon of evanescent coupling, which requires that the objective lens be held very close to the recording layer. The use of evanescent coupling to perform recording allows a smaller spot size, and therefore, greater recording densities and better data throughput.

System 300 has several disadvantages. For example, the surface of layer 309 and the surface of lens 314 closest to the disc can be contaminated, causing permanent damage to data and to the disc drive system.

Another disadvantage of system 300 stems from the fact that because there is one objective lens and no focus actuator, the flying height must be tightly controlled. Variations in the flying height and thickness of protective layer 309 (if there is a protective layer; it is possible to have none) over the recording layer must be controlled within the depth of focus tolerance of the flying lens. Generally, the tolerance of flying height 306 and protective layer 309 thickness is a percentage of the nominal thickness. Therefore, in order to reduce the tolerance, the nominal thickness of protective layer 309 must be reduced. For example, the depth of focus tolerance is generally plus or minus 0.5 micron. A typical tolerance in applying protective layer 309 is ten percent of the thickness of the protective layer. Therefore, flying height 306 and the thickness of protective layer 309 together must be very small for the thickness variation of protective layer 309 to be less than 0.5 micron.

In the case of a near field system such as system 300, the flying height (the distance between the bottom surface of flying lens 314 and the surface of recording layer 308) must be less than the wavelength of the laser light. The wavelength of the laser light is typically 700 nanometers. Therefore, the thickness of a protective layer on recording layer 308 would have to be on the order of 25 nanometers. This is extremely thin and would not protect data on recording layer 308 from manual handling in a removable disc application, or from corrosion or contamination during shelf life. Even with the protection of a cartridge that covers disc 318, some contamination from particles in the atmosphere or from humidity or corrosive gases is inevitable over time.

Conventional disc drives all share similar disadvantages related to access of data on a storage disc. Current disc drives, even those designed to access two-sided media, are limited to accessing one side of the media at a time. It has not been possible, previously, to simultaneously and independently access both sides of a two-sided disc. One of the reasons for this is that reading/writing head mechanisms on either side of the disc are constructed to move together or not at all. Current disc drives therefore have limited data access speeds. This disadvantage is shared by previous MO drives and drives using other technologies, such as those used in computer hard disc drives.

Technology exists to make multiple disc drives appear to a client device as a single drive. Redundant arrays of independent drives (RAIDs) divide incoming data into multiple streams which are written to multiple drives simultaneously. RAID drives can be used to increase throughput by dividing a single incoming data stream and writing portions of it to multiple drives simultaneously. RAIDs can also be used to achieve data redundancy by sending different copies of the same data to multiple drives simultaneously. Although access speed can be increased by using RAIDs, RAIDs are expensive and complex because they are merely devices containing duplicate conventional disc drives, each of which has all the limitations previously discussed with respect to current disc drives.

SUMMARY OF THE INVENTION

It is an object of the invention to provide an MO drive that performs higher density data storage on one-sided or two-sided media that is coated to enable handling of the media without risk of data loss.

It is another object of the invention to provide an MO drive that performs direct overwrite of data without initial erasure.

It is a further object of the invention to provide an MO drive that accesses both sides of a two-sided disc simultaneously and independently.

A method and apparatus for reading from and writing to a magneto-optical disc is described. The apparatus comprises a first objective lens situated between a first side of the magneto-optical disc and a first source of a laser light. The apparatus further comprises a first flying magnetic head situated between the first objective lens and the first side of the magneto-optical disc, including a first coil for supplying a first magnetic field, the first coil defining a light channel through the first flying magnetic head for allowing the laser light to reach the magneto-optical disc.

DETAILED DESCRIPTION

The present invention includes a magneto-optical (MO) disc drive and an MO disc. In one embodiment, recording is performed using a far field technique with a single objective lens focusing collimated laser light. The collimated laser light passes through the objective lens and then passes through an opening through a flying magnetic head that flies above the MO disc. Increased data storage densities are achieved over conventional storage techniques using protected MO discs. In one embodiment, the MO disc includes two opposing recording layers covered with coating layers. In this embodiment, both a flying magnetic head and an objective lens are situated on each side of the MO disc and independently actuated to allow simultaneous and completely independent access to both sides of the MO disc.

Figure 4:
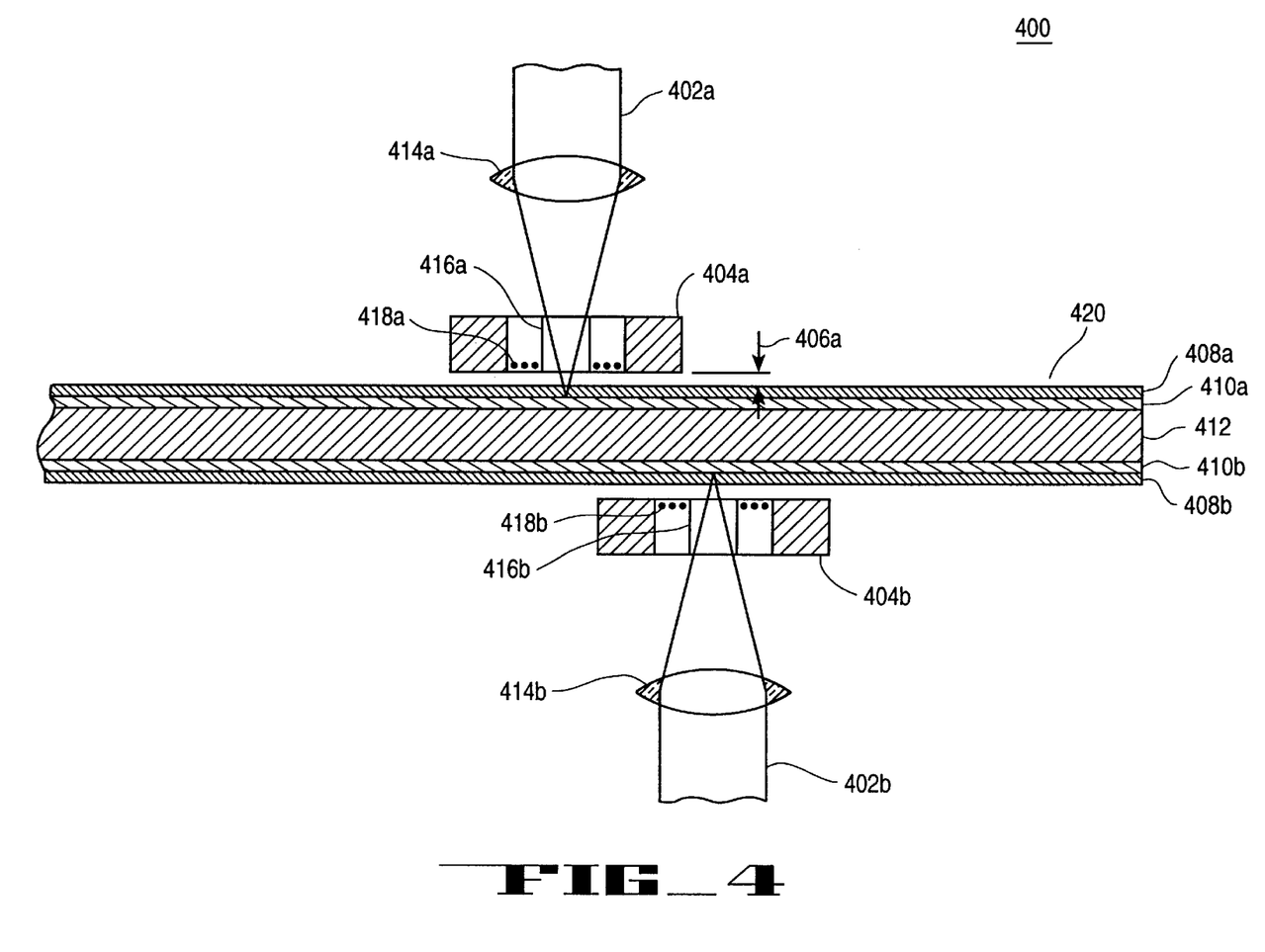
FIG. 4 is a diagram of an MO data storage and retrieval system according to one embodiment of the present invention.

FIG. 4 is a diagram of an MO data storage and retrieval system 400 according to one embodiment of the present invention. In FIG. 4, elements that are similarly numbered except for an "a" or "b" are identical, or functionally equivalent. For example, objective lens 414a is identical, or functionally equivalent to, objective lens 414b.

Objective lens 414a focuses collimated laser light beam 402a. Flying height 406a of magnetic recording head 418a above disc 420 can be 0.05–5.0 microns, depending upon the specific embodiment. Magnetic recording heads 418a and 418b produce magnetic fields with relatively low inductance, allowing direct overwriting of data upon switching the magnetic field. Higher storage densities can be accomplished by modulating magnetic fields produced by magnetic recording heads 418a and 418b during write and read processes.

Magnetic recording head 418a includes light channel 416a which is an opening through the center of magnetic recording head 418a. Slider 404a is integrated with magnetic recording head 418a and enables magnetic recording head 418a to fly above MO disc 420 on an air bearing when disc 420 is spinning. System 400 records data on MO disc 420 using a known far field technique. In far field techniques, the focal distance (the distance from an objective lens to a focal point on a recording layer) is relatively large, and thus the objective lens is not in contact with, or in close proximity to, the recording layer.

MO disc 420, in this embodiment, has spiral grooves in both recording layers. The spiral grooves on opposite recording layers spiral in opposite directions so that the spinning disc can be accessed simultaneously from both sides. Other embodiments use a two-sided MO disc with concentric grooves. Spiral groves are preferable when data to be stored and accessed is of a sequential nature. Concentric grooves are preferable when data to be stored and retrieved is of a less sequential and more "random" nature.

MO disc 420 includes a central substrate layer 412. On either side of substrate layer 412 are recording layers 410a and 410b, respectively. Coating layer 408a forms one surface of MO disc 420 and covers recording layer 410a. Coating layer 408b forms the opposite surface of MO disc 420 and covers recording layer 410b.

In this embodiment, actuators controlling objective lens 414a and magnetic head 418a are completely independent from separate actuators controlling objective lens 414b and magnetic head 418b. Actuators are known in the art and are not shown for clarity. System 400 reads and writes respective sides of MO disc 420 with complete independence. For example, recording layer 410a is written to at the same time recording layer 410b is read from by respective head assemblies.

In the embodiment of FIG. 4, MO data storage and retrieval system 400 includes two magnetic heads 418 and two lenses 402 for independently accessing respective sides of MO disc 420. In other embodiments, the MO data storage and retrieval system could include only one magnetic head 418 and one lens 420.

Figure 5:
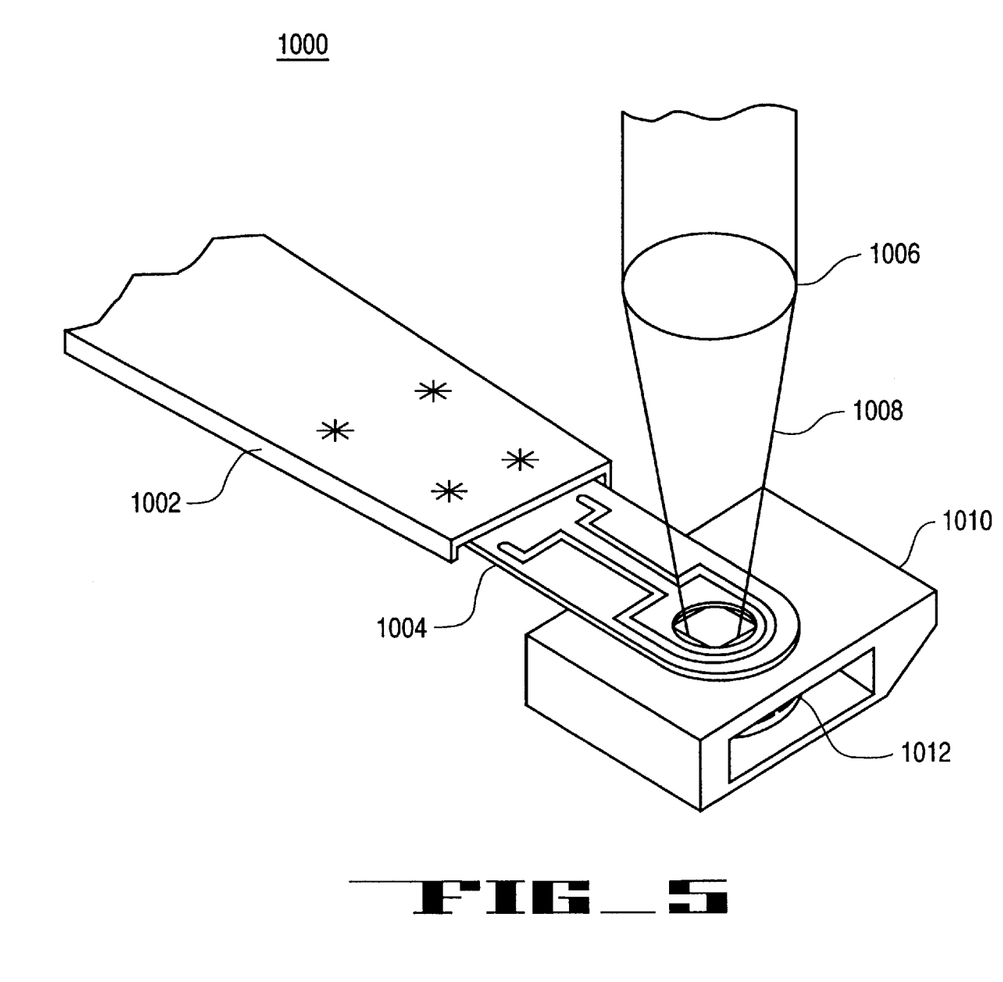
FIG. 5 is a diagram of a magnetic head suspension assembly according to one embodiment.

FIG. 5 is a diagram of slider/magnetic recording head suspension assembly 1000, according to one embodiment. A suspension assembly such as suspension assembly 1000 is used to suspend each slider 404 and magnetic head 418. Magnetic recording head suspension assemblies are not shown in FIG. 4 for clarity. Before read and write operations, slider/magnetic recording head suspension assembly 1000 is loaded by spinning the disc and then engaging, or loading, slider/magnetic recording head suspension assembly 1000. An air bearing is formed between the slider/magnetic recording head assembly 1010 and the spinning disc and the slider surface never comes in contact with the disc surface. In other embodiments, the slider rests on a disc surface when the disc is not moving. In these embodiments, a slider rests on the disc surface until the disc reaches a certain revolutionary speed, after which an air bearing is formed and the slider is separated from the disc surface.

During read and write operations, laser light beam 1008 passes through objective lens 1006 and through light channel 1013 in slider/magnetic recording head assembly 1010. In this embodiment, light channel 1013 is rectangular in this embodiment, but can be round or irregular in other embodiments. Light channel 1013 is surrounded by windings 1012. Slider/magnetic recording head assembly 1010 and windings 1012 are supported by gimbal 1004 and load beam 1002. Gimbal 1004 also has an opening to allow light to pass through gimbal 1004. The opening in gimbal 1004 is rectangular in this embodiment, but can be round or irregular in other embodiments.

Figure 6:
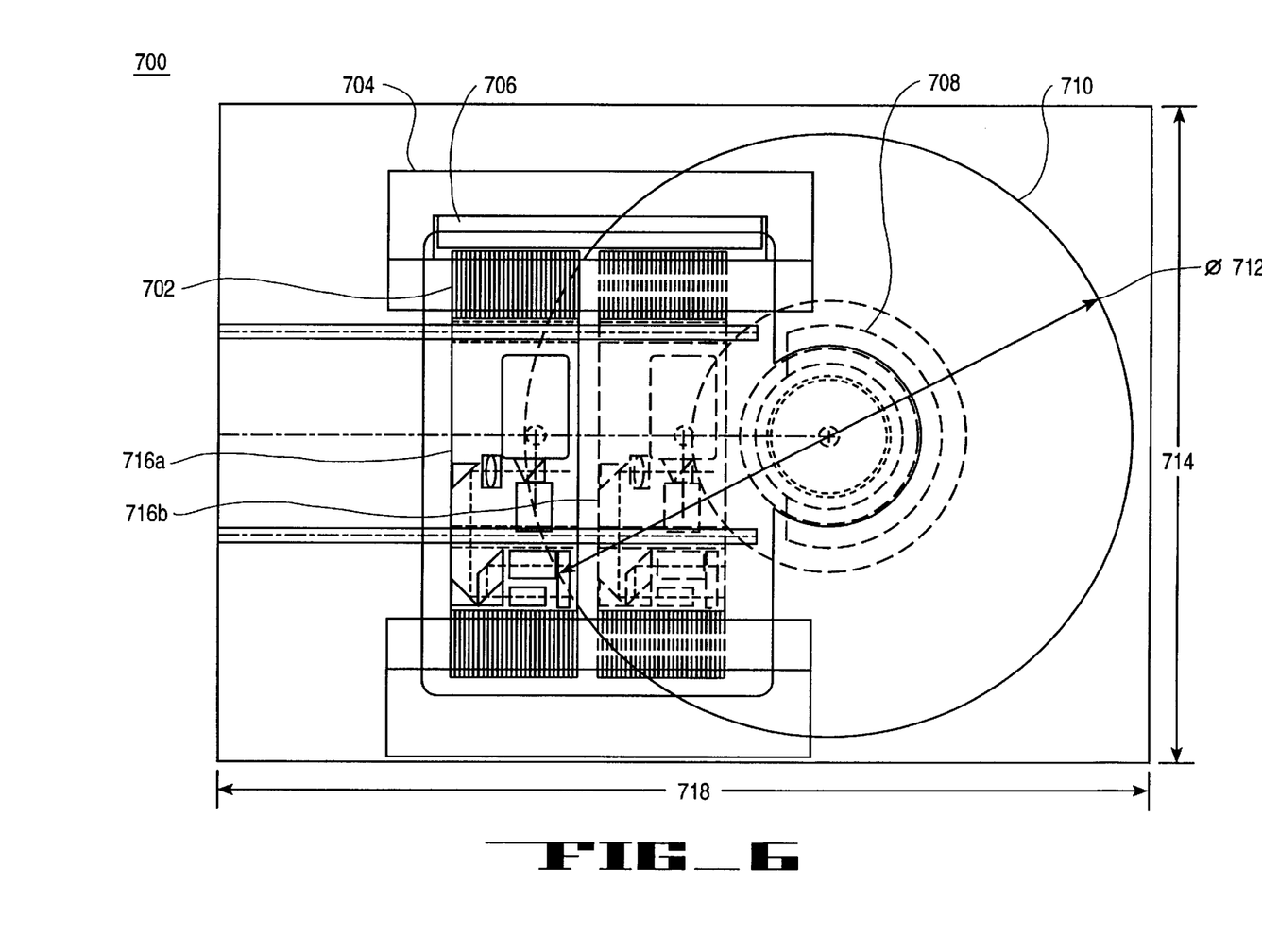
FIG. 6 is a top view of an MO drive according to one embodiment.

FIG. 6 is a top view of disc drive 700 according to one embodiment of the invention. In this embodiment, Disc drive 700 includes two optical pickup/front end electronics assemblies 716a and 716b. Assemblies 716, in this embodiment, are moved back and forth over respective sides of MO disc 710 by a linear actuator. Other embodiments could use other actuators, for example, rotary actuators.

Optical pickup/front end electronics assembly 716a is situated over one side of MO disc 710, and assembly 716b is situated over the opposite side of MO disc 710. Each of the assemblies 716 are integrated optics assemblies. As is known, integrated optics assemblies include, in one unit, a focus actuator, a tracking actuator, a coarse actuator, optical components, and front end electronics. In the embodiment shown in FIG. 6, integrated optics are chosen, in part, for ease of assembly. Extreme precision is required to align the optical components of the mechanism. When integrated optics are used, alignment can be performed on an assembly, such as assembly 716a, on a separate station before assembling the entire disc drive. This makes assembly faster and less expensive.

Other embodiments use split optics. Split optics include a moving portion and a stationary portion. The moving portion travels over the disc and includes an objective lens, a mirror, a fine actuator, a coarse actuator, and a focus actuator. The fixed portion includes a laser diode, a detector, optical components, and front end electronics.

In this embodiment, the focus actuator and the fine actuator are coupled to the coarse actuator. The coarse actuator performs relatively large movements laterally across the surface of the disc. The focus actuator moves axially with respect to the disc for focusing the laser light. The fine actuator performs small lateral movements, or microsteps, for keeping the focused laser light on a track of the disc.

In this embodiment, the magnetic head is coupled to the coarse actuator by compliant, flexible means. The magnetic head, in this embodiment, is decoupled from the focus actuator and from the fine actuator. The objective lens is coupled to the focus actuator and to the fine actuator. In alternate embodiments, the magnetic head is coupled to both the focus actuator and the fine actuator, both of which are, in turn, coupled to the coarse actuator.

Disc drive 700 includes carriage coil 702, return magnetic path assembly 704, and magnet 706. Spindle motor 708 engages MO disc 710 as explained more fully below. In this embodiment, dimension 718 is approximately 200 mm, dimension 714 is approximately 140 mm, and 712 is approximately 130 mm. Other embodiments of disc drive 700 could operate with MO discs of varying form factors. For example, disc drives embodying the invention could be used with MO discs as described herein, but with diameter form factors such as 80 mm, 90 mm, or 120 mm.

Disc drive 700 is an embodiment that includes two optical pickup/front end electronics assemblies. Other embodiments include only one optical pickup/front end electronics assembly that accesses one side of MO disc 710. These embodiments only read or write one side of a disc at one time.

Figure 7:
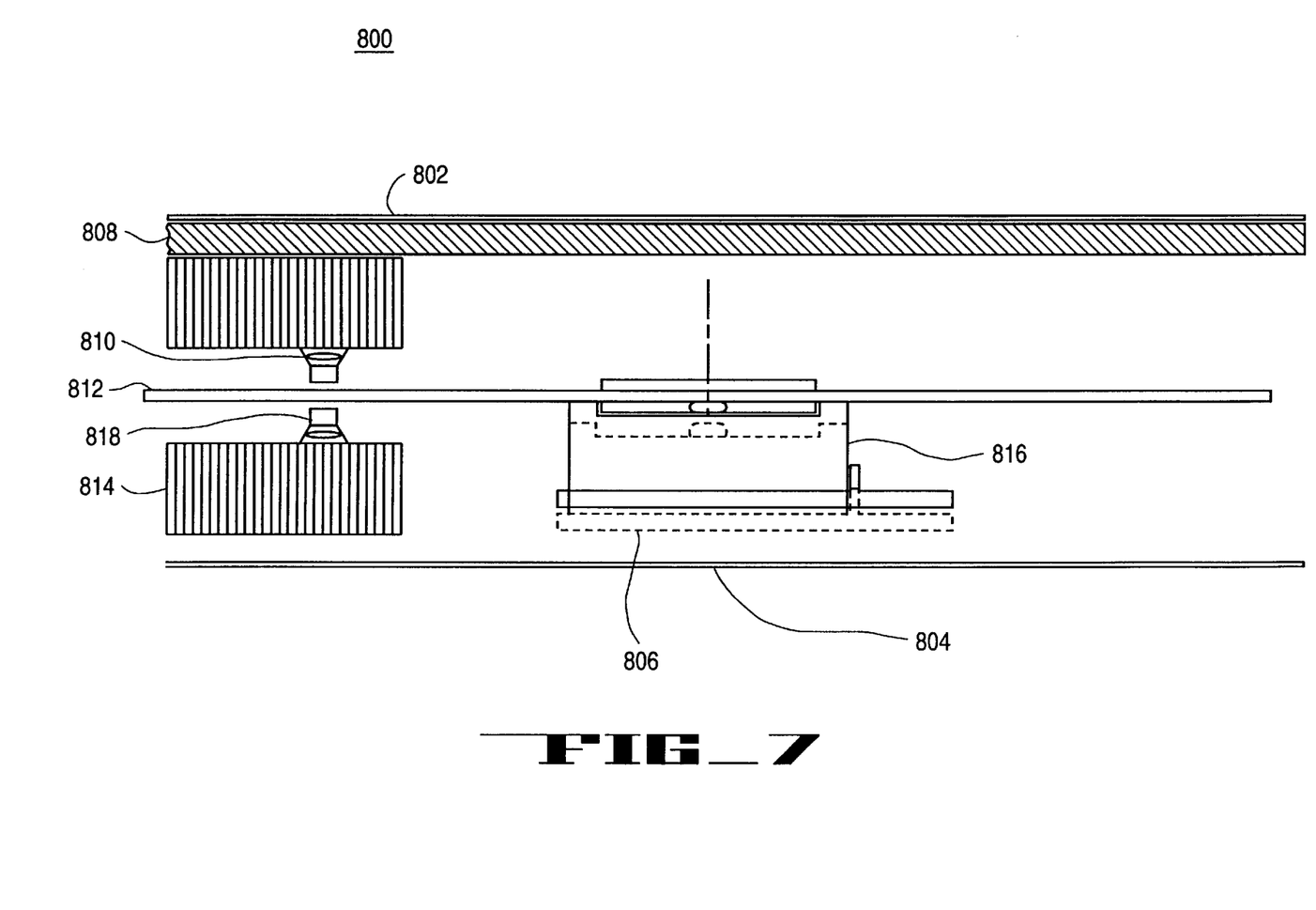
FIG. 7 is a partial side view of the MO drive of FIG. 6.

FIG. 7 is a side view 800 of the disc drive of FIG. 6. Disc drive 700 is partially enclosed by top cover 802, bottom cover 804 and printed circuit board (PCB) assembly 808. Objective lens 810 of assembly 716a is indicated.

Assembly 716a and 716b are identical, or functionally equivalent. Magnetic head and suspension 818 are indicated for assembly 716b. In this embodiment, the magnetic head is designed as a magnetic field modulation head. Magnetic field modulation techniques are known in the art. Coarse carriage coil 814 is indicated for assembly 716b. Spindle motor 816 is shown engaged with disc 812. Reference number 806 designates the spindle motor in the disengaged position. Spindle motor 708 is disengaged during insertion or removal of disc 812. Spindle motor 708 moves up and engages with MO disc 710 after insertion of MO disc 710.

Figure 8:
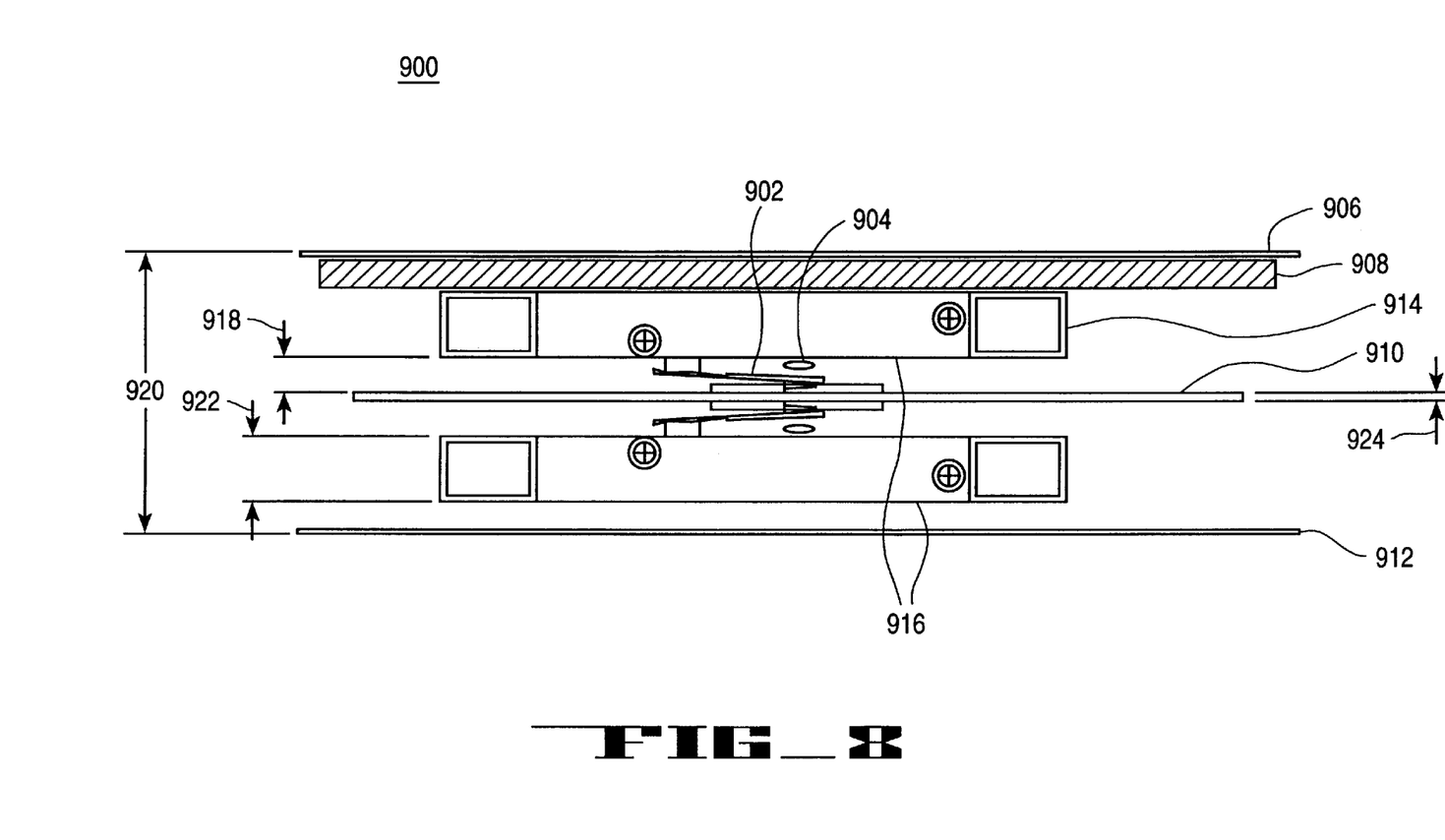
FIG. 8 is a partial end view of the MO drive of FIG. 6.

FIG. 8 is a diagram of end view 900 of disc drive 700. End view 900 references one magnetic head/suspension assembly 902, and objective lens 904. In this embodiment, magnetic head/suspension assembly 902 is mounted on the coarse actuator body and is not attached a focus actuator.

Top cover 906, bottom cover 912, and PCB assemblies 908 are also shown. Optical pickup/front end electronics assemblies 916 are shown on either side of MO disc 910. Carriage coil 914 for one assembly 916 is indicated. In this embodiment, dimension 924, the thickness of MO disc 910, is 0.6–2.4 mm. In this embodiment, dimension 918 is 5 mm, dimension 922 is 10 mm, and dimension 920 is 41.3 mm.

The embodiments shown perform parallel processing of data or redundant processing of data in one disc drive. Optical pickup/front end electronics assemblies 716 of FIG. 6 are operated by independent actuators, and the incoming data stream is divided between the two assemblies to perform independent reading and/or writing to either side of MO disc 710. A user can thus choose to increase throughput, or lower access time, by using parallel access. A user can alternately choose to access both sides of MO disc 710 redundantly in order to produce backup copies of data. When parallel access mode is chosen, client devices that perform command queuing can be serviced more quickly because commands in the queue can be smoothly executed even if they are not of the same type. For example, a write operation can be performed on one side of the MO disc 710 at the same time a read operation is performed on the opposite side of MO disc 710.

The embodiments shown perform MO recording using a far field technique with increased data density, simultaneous, independent access to two data storage surfaces, and direct overwrite capability. Other embodiments include only one optical pickup/front end electronics assembly and therefore do not perform simultaneous, independent access to two data storage surfaces.

The invention has been described in terms of particular embodiments. For example, the embodiments shown include an MO disc of a particular form factor and a disc drive with integrated optics and linear actuators. One skilled in the art, however, may make modifications and alterations to the specific embodiments shown without departing from the spirit and scope of the invention as set forth in the following claims.

What is claimed is:

1. An apparatus for reading from and writing to a magneto-optical disc, comprising:
    a first objective lens situated between a first surface of the magneto-optical disc and a first source of a laser light used for reading from and writing to the magneto-optical disc;
    a first optical assembly comprising:
        a first focus actuator to focus the laser light onto the magneto-optical disc by moving the first objective lens in an axial direction with respect to the first surface of the magneto-optical disc:
        a first magnetic head situated between the first objective lens and the first surface of the magneto-optical disc, the first magnetic head flying above the first surface when the magneto-optical disc rotates at a high velocity the first magnetic head having a first light channel and including a first coil disposed about the first light channel for generating a first magnetic field for reading and writing operations, the laser light passing through the light channel to reach the magneto-optical disc;
        a first coarse actuator to move the first magnetic head laterally across the surface of the magneto-optical disc, the first magnetic head being decoupled from the first focus actuator; and
    a second optical assembly comprising:
        a second objective lens situated between a second surface of the magneto-optical disc and a first source of a laser light used for reading from and writing to the magneto-optical disc, the second surface being opposite to the first surface;
        a second focus actuator to focus the laser light onto the magneto-optical disc by moving the second objective lens in the axial direction with respect to the second surface of the magneto-optical disc;
        a second magnetic head situated between the second objective lens and the second surface of the magneto-optical disc, the second magnetic head flying above the second surface when the magneto-optical disc rotates at the high velocity, the second magnetic head having a second light channel and including a second coil disposed about the second light channel for generating a second magnetic field for reading and writing operations;
        a second coarse actuator to move the second magnetic head laterally across the surface of the magneto-optical disc, the second magnetic head being decoupled from the first focus actuator,
    wherein the first and second optical assemblies are configured for independent and simultaneous data access to both the first and second surfaces of the magneto-optical disc.

2. The apparatus of claim 1, wherein the magneto-optical disc comprises first and second recording layers associated with the first and second surfaces, respectively, a focal distance between the first objective lens and a focal point on a first recording layer and a focal distance between the second objective lens and a focal point on a second recording layer both being appropriate for recording using a far field technique.

3. The apparatus of claim 2, wherein the first optical pickup assembly further comprises:
    a first fine actuator to move the first objective lens laterally in microsteps to keep the laser light focused on a first track of the first recording layer.

4. The apparatus of claim 3, wherein the second optical pickup assembly further comprises:
    a second fine actuator to move the second objective lens laterally in microsteps to keep the laser light focused on a second track of the second recording layer.

* * * * *